Sept. 7, 1954 D. J. MUNROE 2,688,663

RECORDER-REPRODUCER

Original Filed March 4, 1949 2 Sheets-Sheet 1

Inventor
David J. Munroe
By Mason, Kolehmainen, Rathburn & Wyss
Attorneys

RECORDER-REPRODUCER

Original Filed March 4, 1949

2 Sheets-Sheet 2

Inventor
David J. Munroe
By Mason, Kolehmainen, Rathburn & Wyss
Attorneys

Patented Sept. 7, 1954 2,688,663

UNITED STATES PATENT OFFICE 2,688,663

RECORDER-REPRODUCER

David J. Munroe, Racine, Wis., assignor to Webster Electric Company, Racine, Wis., a corporation of Delaware Original application March 4, 1949, Serial No. 79,663. Divided and this application June 14, 1951, Serial No. 231,502

1 Claim. (Cl. 179—100.2)

The present invention relates to magnetic recorder-reproducer apparatus and has for its primary object the provision of a new and improved method of and apparatus for erasing the previous history of recording from a magnetic record medium and thus preparing or conditioning it for a new record. The present application is a division of my copending application Serial No. 79,663, filed March 4, 1949.

Despite long continued and persistent efforts, no one, prior to the present invention, was able to provide a method of or apparatus fully satisfactory to erase previous records from magnetic record media, especially the so-called "high flux" tapes. According to the present invention, this is accomplished by a novel method including the steps of magnetically saturating the tape, decreasing the magnetization, and then subjecting the tape to a high frequency alternating current magnetic field substantially to demagnetize it. It has been found that this method is eminently satisfactory to erase previous records from different types of tapes, including the "high flux" tapes. Also, the apparatus is quite simple, including only a permanent magnet and an alternating current erasing means, the two being located in spaced relation along the path of movement of the tape.

Other objects and advantages of the present invention will become apparent from the ensuing description of an illustrative embodiment of the invention, in the course of which reference will be had to the accompanying drawings, in which.

Figure 1:
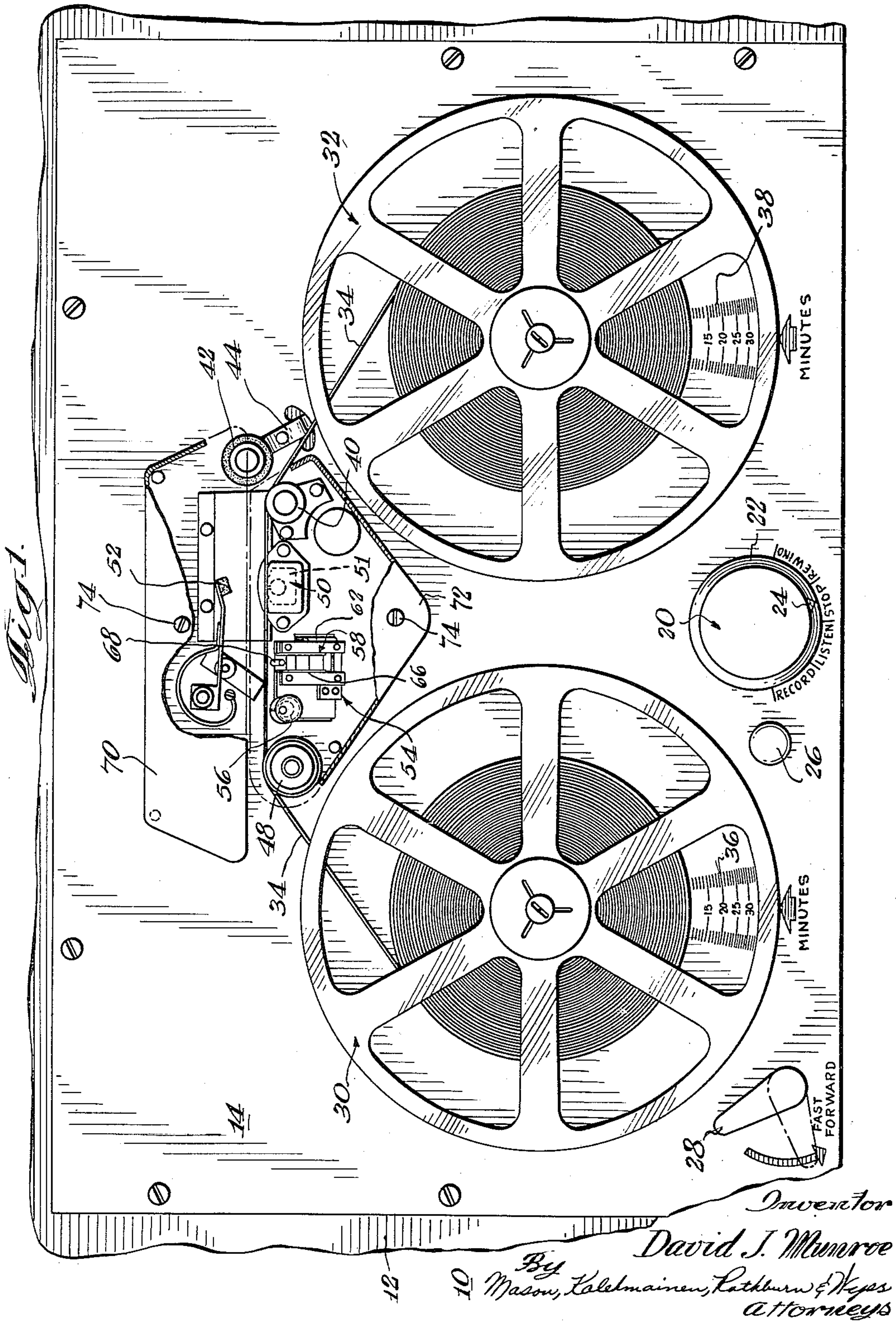
Fig. 1 is a fragmentary top plan view, partly broken away, of recorder-reproducer constructed in accordance with the present invention.

Referring first to Fig. 1 the apparatus is illustrated in its stop position with certain covering structure partly broken away and without its accompanying cabinet and front plate. As heretofore indicated the present application is a division of my above referred to copending application and only sufficient of the apparatus is herein illustrated and described to enable those skilled in the art to ascertain the nature and advantages of the invention. The invention may be utilized with various types of medium but it is particularly designed for use with an elongated magnetizable record medium such as tape coated or impregnated with magnetic material.

The recorder-reproducer is indicated as a whole by reference character 10. It includes a suitable cabinet 12 having a top panel or base plate 14 and it may be provided with a front panel and top covers that are not shown.

The apparatus illustrated is provided with control means for conditioning the apparatus for recording, reproducing, rewinding and fast forward speed. The control means illustrated includes a knob 20 adapted readily to be graspable by the operator and rotated into various positions. The knob is located near the center and at the front of the base plate so that its position can be readily noted and so that it can be easily operated. In order readily to indicate the position of the knob, it is provided with an enlarged lower skirt-like portion 22 upon which is formed an arrow-like point 24, cooperating with suitable indicia printed or otherwise suitably formed on the base plate to indicate the positions referred to above. As indicated, the apparatus is illustrated in its stop position.

The apparatus may include means for preventing accidental conditioning of the apparatus for recording, during which tape conditioning means including the erase means is effective. This preventing means may include an interlock mechanism, not shown in full, but comprising a push button 26 extending above the base plate and which can be depressed to permit control knob 20 to be moved to its record position.

The apparatus can be conditioned for fast forward speed upon movement of a control lever 28 from its indicated solid line position to the phantom line position. This movement can be effected only when the knob 20 is in its listen position.

The record medium is supported above the base plate, and preferably but not necessarily in transparent reels mounted above a suitably marked portion of the base plate so as to enable the operator of the record readily and immediately to observe the length of tape upon both the supply and take-up reels, the length preferably being indicated by the playing or recording time time in minutes. This feature is further disclosed and claimed in my copending application, Serial No. 206,867 filed January 19, 1951

Referring again more particularly to Fig. 1, the supply reel is indicated by the reference character 30 and the take-up real by the reference character 32. The two reels may be identical in construction and may be made of some suitable transparent plastic material, such as Lucite. In Fig. 1, the record medium, indicated by reference character 34, is shown partly upon the supply reel and partly upon the take-up reel. The reels may be of suitable size, those illustrated being adapted to hold about 1,250 feet of record medium and may be and is shown as being coated paper. The base plate is provided with suitable scales 36 and 38 at locations immediately beneath the reels, whereby the length of tape upon each reel can be ascertained at a glance. The scales are identical and include time markings running about thirty minutes. The main graduations are subdivided in suitable manner to enable the operator easily to determine the playing time in minutes.

The tape is driven in forward drive by means including a continuously rotating mechanical capstan 40 rotated at constant speed by a motor (shown schematically by reference character 188 in Fig. 4) and an associated rubber tired pinch roller 42 adapted to hold the tape against the capstan so that the tape will be properly driven thereby. The pinch roller is mounted at the end of a lever 44 and is selectively movable to move the roller into and out of engagement with the capstan. The tape is guided by a guide roller 48 located some distance from the capstan. Between the capstan and guide roller is located a transducer 50 including a core 51 and which is utilized both in recording or reproducing and against which the tape is held by a selectively movable pressure pad 52. Also located between the capstan and pinch roller is the tape conditioning or erase means 54 of the present invention comprising a permanent magnet 56 and an alternating current erasing means including a transformer 58 and which is adapted selectively to be moved into and out of cooperative engagement with the tape, it being shown out of cooperative engagement with the tape, as it is in the stop position, but being movable to bring the permanent magnet and alternating current erase means into cooperative engagement with the tape in the record position.

The tape conditioning means 54 of the present invention, as indicated, includes two tape conditioning devices. The first of these, first in that it acts upon the unconditioned tape before the other, is a generally circular permanent magnet 56 mounted within a plastic cover 60 and supported upon an erase head lever 62 extending above the top of the base plate through an aperture 64 in the plate. The second of the conditioning means is an alternating current erasing means including the transformer 58 and also mounted upon the lever 62. The transformer includes (see also Fig. 4) a primary winding 66 and a single turn secondary winding 68 of which the former is supplied with a high frequency alternating current, as will be described in greater detail hereinafter. The lever 62 is movable between what may be termed operative and inoperative positions. In the operative position, into which it is moved only in the record position of the control knob 20, the erasing means 54 is moved into cooperative relationship to against the tape 34.

The recording and reproducing head 50 and the erasing means 54, as well as the pressure pad assembly, are normally enclosed by the covers 70 and 72. They are detachably secured to the base plate as by the screws 74.

Figures 2, 3, 4:
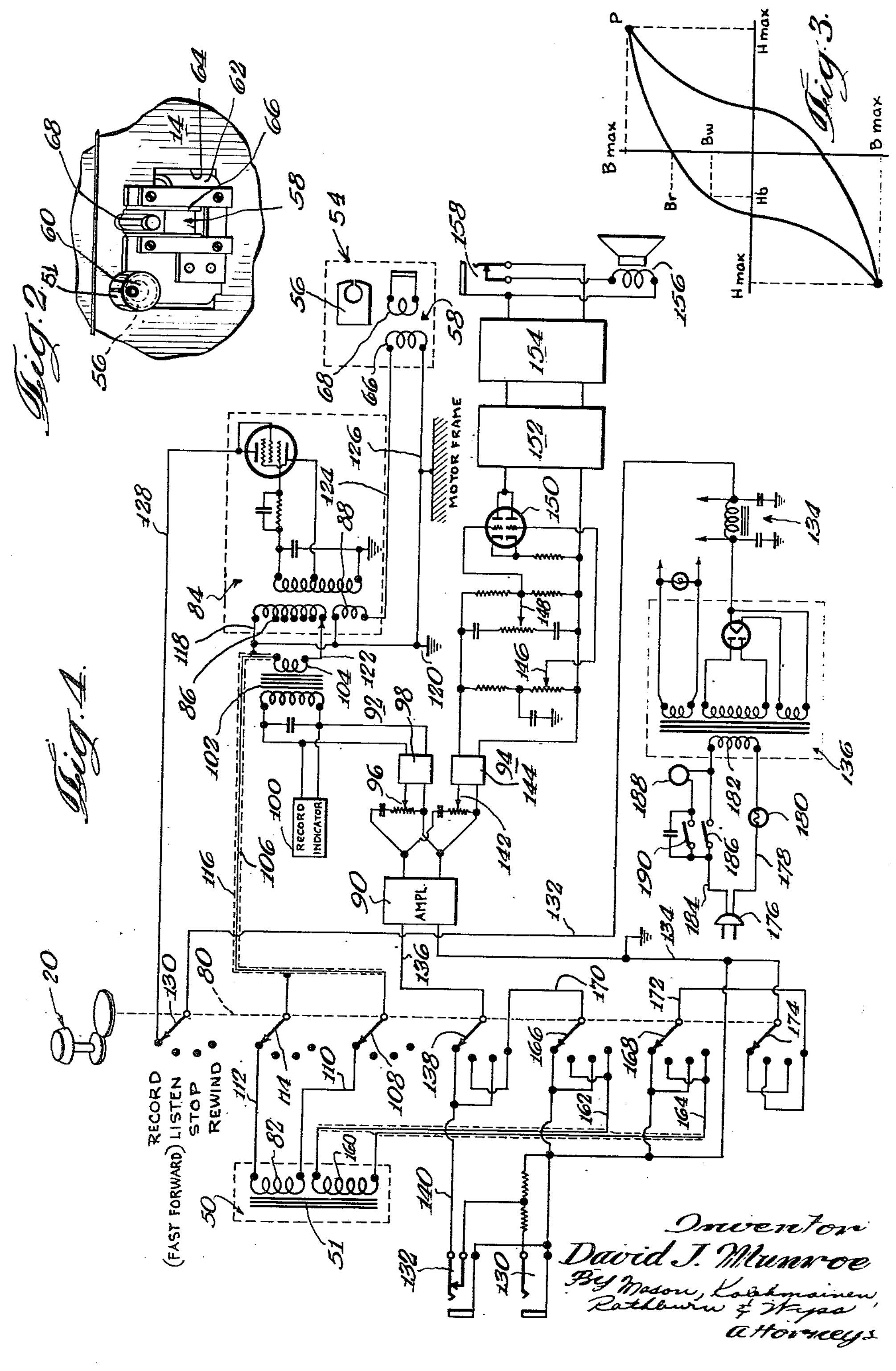
Fig. 2 is an enlarged fragmentary top elevational view of a portion of the apparatus shown in Fig. 1 and illustrating details of the tape conditioning means.
Fig. 3 is a graph used in explanation of the tape conditioning method.
Fig. 4 is a schematic wiring diagram of the apparatus as a whole.

The electrical circuits and controls of the recorder are illustrated in Fig. 4 to which reference will now be had. The control means includes a switch assembly 80 operable by the control knob 20 which also operates the index plate. The selector switch is operable into four positions, the record, listen (also fast forward), stop, and rewind positions. The recorder includes separate recording and reproducing or playback channels, the latter of which is also utilized as a means for monitoring the recording.

Referring now to Fig. 4, it will be noted that the switch assembly 80 is illustrated in its record position. In this position the record coil 82 of the record-playback head 50 is supplied with the signal to be recorded and also with a high frequency constant amplitude signal from an oscillator 84, which may be of the Hartley type and have two output coils 86 and 88, the former of which supplies a high frequency current to the record head and the latter to the primary winding 66 of the erase transformer 58. The record coil 82 is also supplied with the input signal through an amplifier section 90, which is common to both record and playback channels 92 and 94. The amplifier 90 is connected to the record channel through a record volume control 96. The latter is connected to an amplifier section 98, to the output of which is connected a record indicator 100. The output of the amplifier 98 is connected to transformer 102 and the secondary winding 104 of the latter is connected in series with the record coil 82 and the oscillator output coil 86. This series connection is effected through conductor 106, switch blade 108, conductor 110, the record coil 82, conductor 112, switch blade 114, the shield conductor 116, conductor 118 (which is grounded at 120), the output coil 86, and conductor 122.

The alternating current erase means transformer primary winding 66 is connected to the oscillator output coil 88 permanently through a circuit including conductors 124 and 126, the latter of which may be connected, as shown, to the frame of motor 188, which is grounded.

The oscillator is rendered operative only in the record position of the switch 80. In this position the plate circuit of the oscillator is completed through conductor 128, switch blade 130, and the plate voltage supply conductor 132 leading to a filter 134 connected to the output of a rectifier 136, which may be of conventional construction.

Brief consideration will now be given to the remainder of the circuit of Fig. 4. In the record position the input of amplifier 90 is also connected to both the high and low level jacks 130 and 132. This connection includes a grounded conductor 134, conductor 136, switch blade 138 and conductor 140.

The playback channel 94, which is also used for monitoring during recording, is connected to the output of the amplifier 90 through a listening volume control 142. The latter is connected to an amplifier section 144. Bass and treble controls 146 and 148 are connected to the output of amplifier 144. The channel includes also a tube 150 of the dual triode type, an inverter-amplifier section 152, a push-pull output stage 154, to the output of which are connected a loud speaker 156 and an external speaker jack 158.

In use the recording volume is controlled through the use of the record indicator. The bass and treble controls are independent of the record control so that adjustment of them to provide a good loud speaker output does not affect the recording.

In the listen position of the switch 80, the oscillator 84 is rendered inoperative, the record coil 82 is disconnected and the playback or reproduce coil 160 is connected to the input of amplifier 90, which remains connected to the playback channel 94 and thus to the loud speaker. The reproducer coil is connected to the amplifier input through the shielded conductors 162, 164, the switch blades 166 and 168, conductors 170 and 172, switch blades 138 and 174, and conductors 136 and 134, respectively.

In the stop position of the switch, both the record and playback coils are disconnected, the oscillator remains inoperative, and the amplifier input is connected to the input jack.

In the rewind position the record coil is disconnected, the oscillator is inoperative, and the playback coil 160 is connected to the input of the amplifier.

Power may be supplied to the recorder from the usual 110 volt power supply lines through a plug 176. One of the plug conductors 178 is connected through a fuse 180 to the primary winding 182 of the power transformer associated with rectifier 136. The other conductor 184 is adapted to be connected to the other terminal of the primary winding upon closure of an on-off switch 186. The apparatus is provided with the previously mentioned constant speed motor 188 driving the capstan and tape spools and which is adapted to be energized upon the closure of a motor switch 190.

The erasing means of the present invention is thus rendered electrically effective by switching means and is mechanically shifted against the tape in the record position of the control knob. Accordingly both the permanent magnet and the alternating current erasing means act upon the tape and they, conjointly, provide a very effective tape conditioning means and one which is particularly suited for "high flux" tapes—i. e., tapes which have high retentivity. The method also enables a relatively small alternating current erasing means to be used and requires but little power.

The tape conditioning method of the present invention comprises the steps of saturating the tape, decreasing the magnetization and then subjecting the tape to a high frequency alternating current magnetic field substantially to demagnetize it. The saturation and decrease in saturation are accomplished by moving the tape past a direct current magnet having a core with a narrow air gap providing a region of high intensity magnetization and pole pieces which recede from the path of tape movement. This can be conveniently done through the use of a magnet core that is substantially circular at its external periphery, such as the core 51. The tape passing past the magnet is magnetized sufficiently substantially to saturate it when it is in the region of the gap, as indicated by the point P on the graph of Fig. 3. At this point the magnetic coating of the tape is subjected to a magnetizing force $H_{max}$ producing flux of an intensity $B_{max}$. If the tape could be moved out of this field with no further influence from the magnet, the magnetic material would retain a peak residual magnetism represented by $B_r$. The tape, however, is gradually moved away from the gap and, at the same time, it moves away from the core. In so doing it is subjected to a demagnetizing force, which can be assumed to be $-H_b$, so that the coating on the tape is demagnetized to have a residual magnetism $B_w$ as it leaves the permanent magnet. The reduction is such that when the alternating current magnetic field acts on the tape, substantially all of the remaining previous magnetization is removed.

The foregoing tape conditioning method has been found very effective with "high flux" tapes, which cannot be satisfactorily conditioned by direct current or alternating current erasing methods. Also, alternating current erasing apparatus requiring less power can be used.

While the present invention has been described with an illustrative embodiment, it should be understood that the details thereof are not intended to be limitative of the invention except insofar as set forth in the accompanying claim.

What is claimed as new and desired to be secured by Letters Patent of the United States is:

Magnetic recording apparatus, including in combination, magnetic recording means for recording upon a movable elongated magnetic recording medium and apparatus located in advance of said recording means for conditioning the moving magnetic medium for recording by said means, said conditioning means including a permanent magnet located in proximity to the moving recording medium and adapted magnetically to saturate the medium and then gradually to decrease the magnetization, and high frequency alternating current energized magnetic erasing means located in proximity to the recording medium in a region between said magnet and recording means and adapted substantially to demagnetize the medium before it reaches the recording means.

References Cited in the file of this patent

FOREIGN PATENTS

| Number | Country | Date |
|---|---|---|
| 883,022 | France | Mar. 15, 1943 |